(12) United States Patent
Aulakh et al.

(10) Patent No.: US 8,172,440 B2
(45) Date of Patent: May 8, 2012

(54) CONCEALED ILLUMINATED CENTER HIGH MOUNT STOP LAMP (CHMSL)

(75) Inventors: Gurpreet Aulakh, Brownstown Township, MI (US); Ronald H. Miller, Saline, MI (US); Aric D. Shaffer, Ypsilanti, MI (US); Dumitru Raceu, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 12/139,986

(22) Filed: Jun. 16, 2008

(65) Prior Publication Data

US 2009/0310380 A1    Dec. 17, 2009

(51) Int. Cl.
*B60Q 1/26* (2006.01)
(52) U.S. Cl. .......................... 362/496; 362/540; 362/541
(58) Field of Classification Search ............... 362/506, 362/505, 496, 540–542; 296/191; 40/541; 427/355, 407.2; 340/468, 479
See application file for complete search history.

(56) References Cited

U.S. PATENT DOCUMENTS

| | | | |
|---|---|---|---|
| 4,373,153 A * | 2/1983 | Sano et al. ................ 340/479 |
| 5,615,940 A * | 4/1997 | Barry ........................ 362/473 |
| 5,895,115 A | 4/1999 | Parker et al. |
| 6,508,563 B2 | 1/2003 | Parker et al. |
| 6,520,669 B1 | 2/2003 | Chen et al. |
| 6,735,893 B2 | 5/2004 | Wolf |
| 6,886,956 B2 | 5/2005 | Parker et al. |
| 6,939,029 B1 | 9/2005 | Stahel et al. |
| 6,976,774 B2 | 12/2005 | Reiss |
| 7,374,322 B2 * | 5/2008 | Steen et al. .............. 362/487 |
| 7,497,604 B2 * | 3/2009 | Kleber et al. ............. 362/506 |
| 7,763,332 B2 * | 7/2010 | Denet ........................ 428/31 |
| 2004/0105274 A1 | 6/2004 | Pommeret et al. |
| 2004/0160786 A1 | 8/2004 | Bauer et al. |
| 2005/0041435 A1 | 2/2005 | Moisel |
| 2005/0047168 A1 | 3/2005 | Reiss |
| 2005/0169002 A1 | 8/2005 | Steen et al. |
| 2005/0219854 A1 | 10/2005 | Grady |
| 2006/0203504 A1 | 9/2006 | Mori |

* cited by examiner

*Primary Examiner* — Thomas Sember
(74) *Attorney, Agent, or Firm* — Gregory P. Brown; Price Heneveld LLP

(57) ABSTRACT

A vehicle including a center high mount stop lamp (CHMSL). The vehicle includes a vehicle body panel formed of a light emitting material of a predetermined color, including a first surface area, and coated with a paint of a predetermined color. A CHMSL housing may be mounted on one side of the vehicle body panel, and one or more light sources may be disposable adjacent or within the CHMSL housing for emitting light through a second surface area of the vehicle body panel when the light source is turned on, with the second surface area being smaller than the first surface area.

23 Claims, 5 Drawing Sheets

CONCEALED ILLUMINATED CENTER HIGH MOUNT STOP LAMP (CHMSL)

BACKGROUND OF INVENTION a. Field of Invention

The invention relates generally to vehicle lighting systems, and, more particularly, to a concealed vehicle center high mount stop lamp (CHMSL).

b. Description of Related Art

Vehicle center high mount stop lamps (CHMSLs) are well known in the art and are typically used in a variety of vehicles for providing a secondary means of warning or signaling when a vehicle's brakes are applied or when a vehicle's lights are turned on. Typically a CHMSL is mounted at or behind the vehicle rear window, and can be mounted at a variety of other locations, such as on the rear of the vehicle trunk, or in case of SUVs, CUVs and vans, on top of the lift gate.

For such CHMSLs mounted on the rear of the vehicle trunk or on top of the lift gate, the recessed area for the CHMSL cannot be stamped in the vehicle body panel because metal stamping operations providing the necessary depth would wrinkle, tear and/or damage the body panel. Thus, it becomes necessary to weld a separate metal pocket to a hole cut in the body panel to provide the recessed area for the CHMSL. However, the separate metal pocket causes variations in the welding process, variations in the alignment tooling for holding the pocket to the body panel and variations in the actual pocket itself. These variations can result in a poorly fitted CHMSL light assembly in the body panel. Further, the connection point between the pocket and the body panel has to be sealed. Thus, the requirement for a pocket increases the vehicle part count, assembly time, and can potentially create leaks. Yet further, for trunk or lift gate mounted CHMSLs, a separate piece of CHMSL light breaks the vehicle rear styling line and color scheme.

Accordingly, there remains a need for a vehicle concealed illuminated CHMSL, which is economical to manufacture, install and service, as compared to existing pocket-based CHMSL designs, and which is further robust in design for long term use in a variety of vehicles, including, SUVs, sedans, coupes and sports cars. There also remains a need for a CHMSL design which reduces design and tooling costs, and which further meets automotive fit and tolerance requirements for such components.

SUMMARY OF INVENTION

The invention solves the problems and overcomes the drawbacks and deficiencies of prior art vehicle CHMSL designs by providing a novel CHMSL design which is simple and economical to manufacture and install into a vehicle while facilitating the vehicle assembly process.

Thus, an exemplary aspect of the present invention is to provide a vehicle CHMSL which is usable with a variety of vehicles, including, SUVs, sedans, coupes and sports cars.

Another aspect of the present invention is to provide a vehicle CHMSL design which incorporates the CHMSL at the rear of the vehicle and does not affect vehicle styling and color schemes.

Yet another aspect of the present invention is to provide a vehicle CHMSL design which eliminates the requirement for a separate metal pocket welding process that makes a hole in order to accommodate the CHMSL.

Another unique aspect of the present invention is to provide a vehicle CHMSL design which gives a new look to the CHMSL design while meeting Federal Motor Vehicle Safety Requirements (FMVSS).

The invention achieves the aforementioned exemplary objectives by providing a vehicle including a center high mount stop lamp (CHMSL). The vehicle may include a vehicle body panel formed of a light emitting material of a predetermined color, including a first surface area, and coated with a paint of a predetermined color. A CHMSL housing may be mounted on one side of the vehicle body panel, and at least one light source may be disposable adjacent or within the CHMSL housing for emitting light through a second surface area of the vehicle body panel when the light source is turned on, with the second surface area being smaller than the first surface area.

For the vehicle described above, the vehicle body panel may be formed of PC (Polycarbonate), PC/ABS (Polycarbonate/Acrylonitrile-Butadiene-Styrene) and/or Acrylic. The light source may be a light emitting diode (LED), an organic light emitting diode (OLED), flexible Electroluminescence (EL), incandescent light bulb and/or neon light. In a particular embodiment, the paint may be a high gloss paint, and non-clear. In a particular embodiment, the paint on the first surface may be a different color than the paint on the second surface. In a particular embodiment, a paint thickness of the first surface area may be approximately 6-10 microns and a paint thickness of the second surface area may be approximately 3-5 microns based on how much light needs to be transmitted.

The invention also provides a center high mount stop lamp (CHMSL) for a vehicle including a vehicle body panel formed of a light emitting material, including a first surface area, and coated with a paint of a predetermined color. The CHMSL may include a CHMSL housing mountable on one side of the vehicle body panel. At least one light source may be disposable adjacent or within the CHMSL housing for emitting light through a second surface area of the vehicle body panel when the light source is turned on, with the second surface area being a different size than the first surface area.

For the CHMSL described above, the second surface area may be smaller than the first surface area. The vehicle body panel may be formed of PC (Polycarbonate), PC/ABS (Polycarbonate/Acrylomtrile-Butadiene-Styrene) and/or Acrylic. The light source may be a light emitting diode (LED), an organic light emitting diode (OLED), flexible Electroluminescence (EL), incandescent light bulb and/or neon light. In a particular embodiment, the paint may be a high gloss paint, and non-clear paint. The paint on the first surface may be a different color than the paint on the second surface. In a particular embodiment, a paint thickness of the first surface area may be approximately 6-10 microns and a paint thickness of the second surface area may be approximately 3-5 microns based on how much light needs to be transmitted.

The invention also provides a method of manufacturing a vehicle including a center high mount stop lamp (CHMSL). The method may include forming a vehicle body panel of a light emitting material of a predetermined color and including a first surface area, coating the vehicle body panel with a paint of a predetermined color, mounting a CHMSL housing on one side of the vehicle body panel, and mounting at least one light source adjacent or within the CHMSL housing for emitting light through a second surface area of the vehicle body panel when the light source is turned on, with the second surface area being smaller than the first surface area.

For the method described above, the method may further include placing a first masking tape over the second surface area and painting the remaining first surface area, and placing a second masking tape having a cutout defined by the first surface area over the remaining first surface area and painting the second surface area so that a paint thickness of the first surface area is different from a paint thickness of the second surface area.

For the method described above, the vehicle body panel may be formed of PC (Polycarbonate), PC/ABS (Polycarbonate/Acrylonitrile-Butadiene-Styrene) and/or Acrylic. The light source may be a light emitting diode (LED), an organic light emitting diode (OLED), flexible Electroluminescence (EL), incandescent light bulb and/or neon light.

In a particular embodiment, the paint may be a high gloss paint, and the paint may be a non-clear paint. The paint on the first surface may be a different color than the paint on the second surface. In a particular embodiment, a paint thickness of the first surface area may be approximately 6-10 microns and a paint thickness of the second surface area may be approximately 3-5 microns based on how much light needs to be transmitted.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
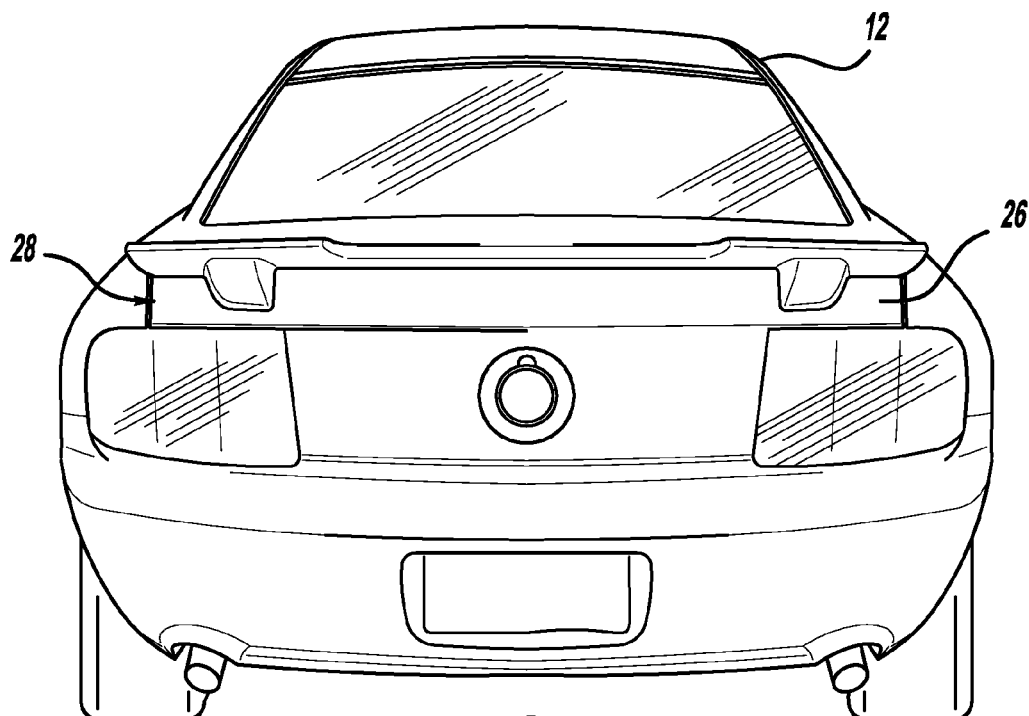
FIG. 1 is a view of a vehicle rear end including a CHMSL design according to the present invention, with the vehicle being a car and the CHMSL being in an OFF configuration.

Referring now to the drawings wherein like reference numerals designate corresponding parts throughout the several views, FIGS. 1-6 illustrate a CHMSL design according to the present invention, generally designated "CHMSL 10."

Figure 2:
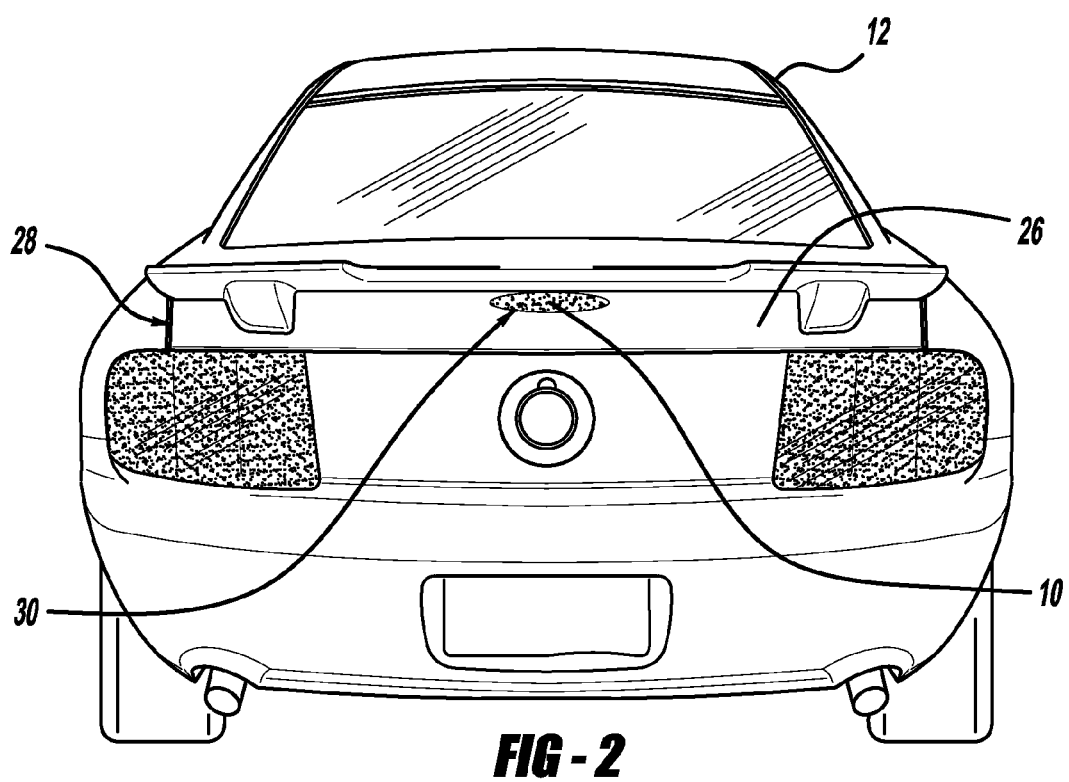
FIG. 2 is a view of the vehicle rear end of FIG. 1, with the CHMSL being in an ON configuration.
Figure 3:
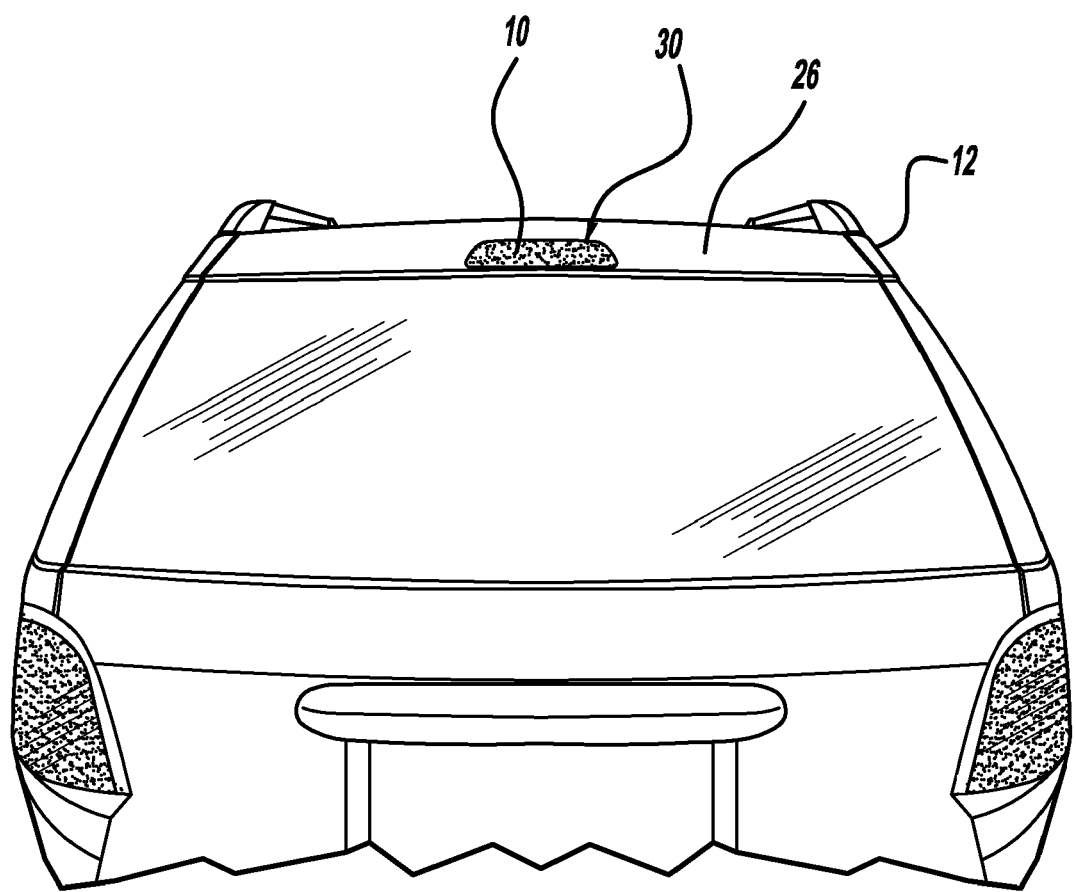
FIG. 3 is a view of a vehicle rear end including a CHMSL design according to the present invention, with the vehicle being a van and the CHMSL being in an ON configuration.
Figure 4:
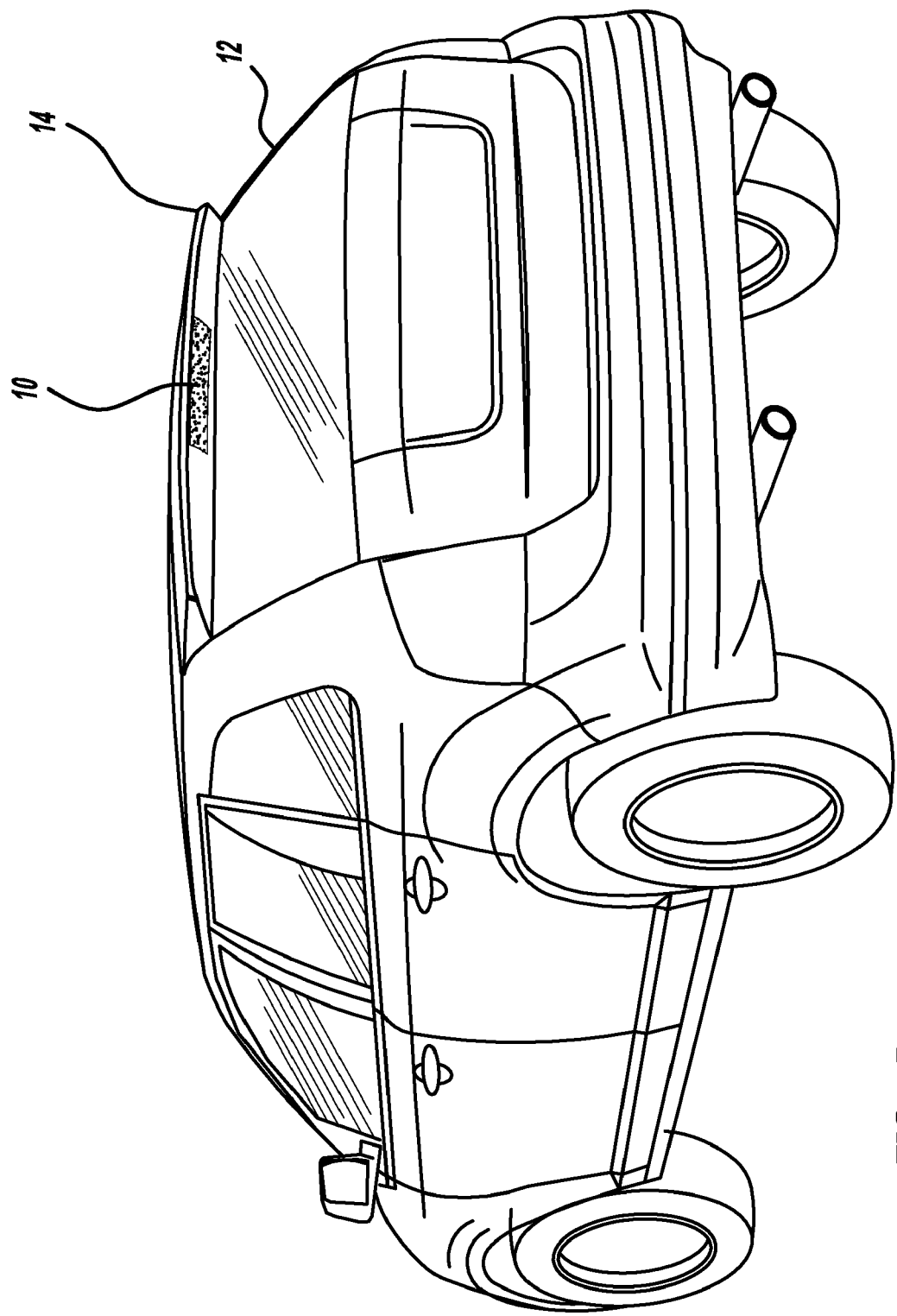
FIG. 4 is an isometric view of another exemplary spoiler CHMSL design according to the present invention, with the vehicle being a SUV and the CHMSL being in an ON configuration.
Figure 5:
FIG. 5 is an isometric view of the spoiler for the SUV of FIG. 4.
Figure 6:
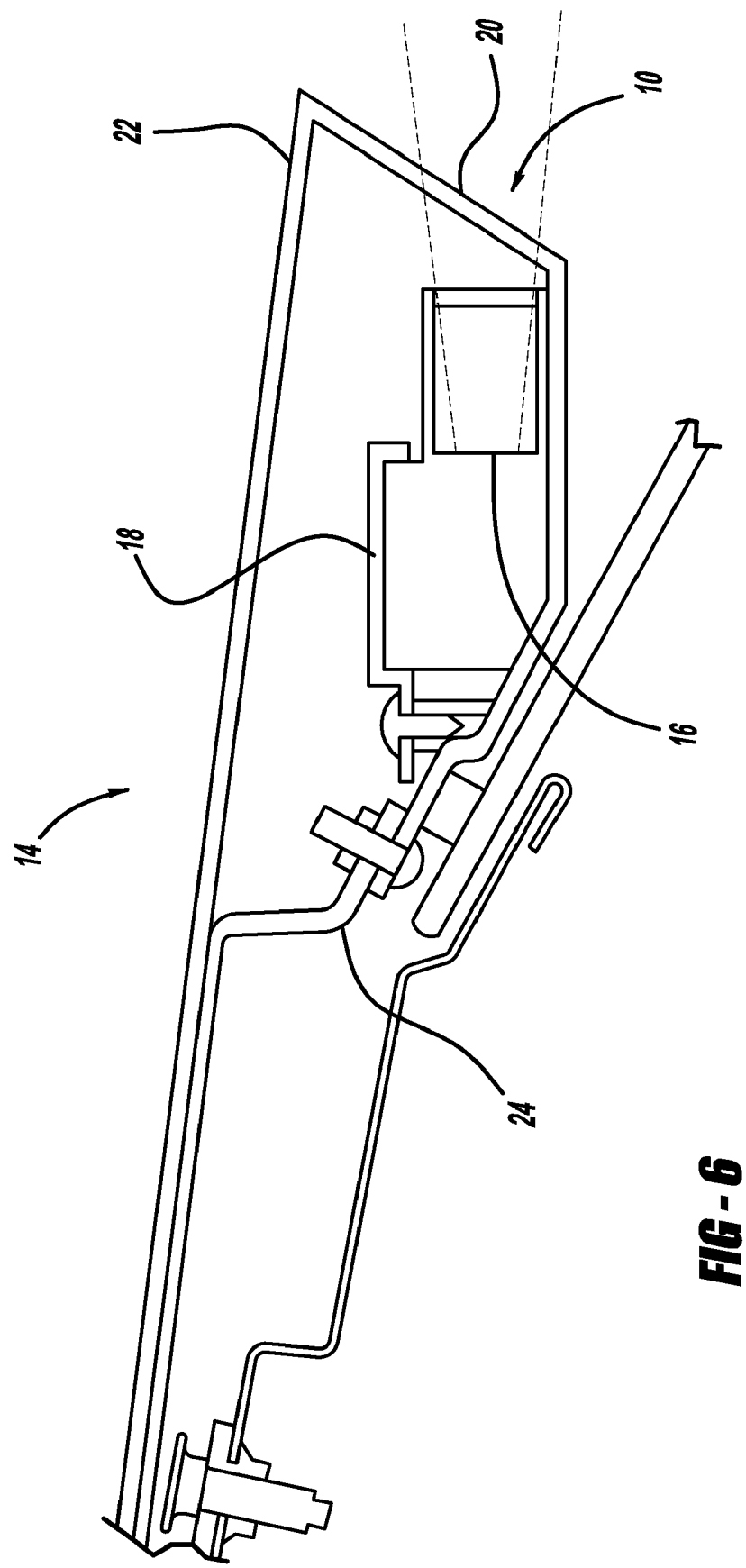
FIG. 6 is a sectional view of the spoiler of FIG. 5, illustrating the various layers of the CHMSL design according to the present invention.

Referring to FIGS. 1-6, CHMSL 10 may be generally used at the rear of a vehicle 12, such as a car as shown in FIG. 1, a van as shown in FIG. 3, a SUV as shown in FIG. 4, or any other vehicle as would be readily apparent to those skilled in the art. Referring to FIG. 6 which illustrates a sectional view of a spoiler 14 of FIG. 5, CHMSL 10 may generally include an illumination source 16, such as one or more light emitting diodes (LED), or other sources such as organic light emitting diodes (OLED), flexible Electroluminescence (EL), incandescent light bulbs and/or neon lights. A housing 18 may include a panel 20 of a predetermined color (i.e. red/yellow) to allow light emitted from illumination source 16 to be displayed. In the embodiment of FIG. 1, panel 20 may be the downwardly sloped area of trunk lid 28. Further, panel 20 may be formed as a single component of spoiler 14 as shown in FIG. 6, or separately as a component of housing 18 for allowing light emitted from illumination source 16 to be displayed. Panel 20 through which light is emitted may be formed of PC (Polycarbonate), PC/ABS (Polycarbonate/Acrylonitrile-Butadiene-Styrene), Acrylic, or another clear plastic material that allows light transmission. The associated wiring (not shown) for illumination source 16 may be held in place in a conventional manner. Housing 18 may be bolted or mounted to structure 22, 24 of spoiler 14 as illustrated and as readily apparent to those skilled in the art.

In the exemplary embodiment of FIG. 2, CHMSL 10 may be created by first manufacturing area 26 from PC (Polycarbonate), PC/ABS (Polycarbonate/Acrylonitrile-Butadiene-Styrene), Acrylic, or another clear plastic material that allows light transmission. As readily apparent to those skilled in the art, only a portion of trunk lid 28 may be manufactured of the aforementioned light transmitting materials. In the case of spoiler 14 or other similar components, the entire component may be manufactured of the aforementioned light transmitting materials. Illumination source 16 and housing 18 may then be attached behind area 26 in a similar manner as shown for spoiler 14 of FIG. 6. Prior to or after attachment of illumination source 16, outer surface of area 26 (or the entire surface in the case of spoiler 14) may be coated with a high gloss paint of a predetermined color, and thereafter, a clear coat may be applied.

Alternatively, referring to FIG. 2, a first masking tape (not shown) may be placed on area 30 defining the illumination area of CHMSL 10 and a suitable high gloss paint of a predetermined color may be applied to the remaining surface of area 26. The high gloss paint maybe applied at a thickness of approximately 6-10 microns. Thereafter, the masking tape placed on area 30 may be removed and a second masking tape (not shown) including a cutout of the same dimensions as area 30 may be placed on area 26 of trunk lid 28. A coating of high gloss paint of the same color as the remaining surface of area 26 may now be applied to the cutout area at a thickness of approximately 3-5 microns. The second masking tape may then be removed and a final clear coat may applied to the entire area 26, including area 30 of CHMSL 10. In this manner, area 30 of CHMSL 10 is concealed and blends with the body paint of area 26 and vehicle 12 generally. The differences in the thickness of paint for area 30 and the remaining area 26 of trunk lid 28 allow for a predetermined amount of light to shine through area 30 of CHMSL 10.

Those skilled in the art would appreciate in view of this disclosure that various modifications may be made to the aforementioned CHMSL design without departing from the scope of the present invention. For example, one or both of the first or second masking tapes may be eliminated if the paint thickness of areas 26 and 30 are to be the same. Alternatively, those skilled in the art would appreciate in view of this disclosure that area 30 of CHMSL 10 may also be painted in a different color/paint than area 26 to provide yet a farther distinctive look to CHMSL 10, or predetermined light emission characteristics. Yet further, instead of the masking being applied to areas 26 and 30 as discussed above, masking may be applied on an inside surface except the CHMSL surface or masking may be applied on an inside CHMSL surface, and the inside of spoiler 14 may be painted with a black or black/red paint mixture to eliminate light scattering through the rest of the spoiler. Thereafter, the masking may be removed and the outside of the spoiler may be painted to a uniform paint thickness of, for example, 3-5 microns.

To summarize, the present invention thus provides a CHMSL design which is simple and economical to manufacture and install into a vehicle while facilitating the vehicle assembly process. The invention also provides a CHMSL design which is usable with a variety of vehicles, including, SUVs, sedans, coupes and sports cars, and which incorporates the CHMSL at the rear of the vehicle and does not affect vehicle styling and color schemes. Yet further, the aforedescribed CHMSL design eliminates the requirement for a separate metal pocket welding process that makes a hole in order to accommodate the CHMSL, and meets Federal Motor Vehicle Safety Requirements (FMVSS).

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle including a center high mount stop lamp (CHMSL), said vehicle comprising:
    a vehicle body panel formed of a light emitting material and including a first surface area thickly-coated with a first-colored paint and integrally formed with a second surface area not thickly-coated with a second-colored paint;
    a CHMSL housing mounted behind said vehicle body panel; and
    a light source disposed adjacent said CHMSL housing for emitting light through the second surface area.

2. A vehicle according to claim 1, wherein said vehicle body panel is formed of at least one of PC (Polycarbonate), PC/ABS (Polycarbonate/Acrylonitrile-Butadiene-Styrene) and Acrylic.

3. A vehicle according to claim 1, wherein said light source is at least one of a light emitting diode (LED), an organic light emitting diode (OLED), flexible Electroluminescence (EL), incandescent light bulb and neon light.

4. A vehicle according to claim 1, wherein the second-colored paint is a high gloss paint.

5. A vehicle according to claim 1, wherein the first-colored paint is a non-clear paint.

6. A vehicle according to claim 1, wherein a paint thickness of the first surface area is approximately 6-10 microns.

7. A vehicle according to claim 1, wherein a paint thickness of the second surface area is approximately 3-5 microns.

8. A center high mount stop lamp (CHMSL) for a vehicle including a vehicle body panel having an opaque first surface area thickly-coated with a first paint and a translucent second surface area thinly-coated with a second paint and molded together as a single integral piece, said CHMSL comprising:
    a CHMSL housing mounted behind the vehicle body panel; and
    a light source disposed adjacent said CHMSL housing for emitting light through the . second surface area of the vehicle body panel.

9. A CHMSL according to claim 8, wherein the second surface area is smaller than the first surface area.

10. A CHMSL according to claim 8, wherein the vehicle body panel is formed of at least one of PC (Polycarbonate), PC/ABS (Polycarbonate/Acrylonitrile-Butadiene-Styrene) and Acrylic.

11. A CHMSL according to claim 8, wherein said light source is at least one of a light emitting diode (LED), an organic light emitting diode (OLED), flexible Electroluminescence (EL), incandescent light bulb and neon light.

12. A CHMSL according to claim 8, wherein a high gloss paint is disposed on the second surface area.

13. A CHMSL according to claim 8, wherein a non-clear paint is disposed on the first surface area.

14. A vehicle according to claim 8, wherein a paint thickness of the first surface area is approximately 6-10 microns.

15. A vehicle according to claim 8, wherein a paint thickness of the second surface area is approximately 3-5 microns.

16. A method of manufacturing a vehicle including a center high mount stop lamp (CHMSL), said method comprising:
    forming a vehicle body panel of a light emitting material of a predetermined color from a single integral piece of material and including a first surface area adjacent to a second surface area;
    coating the first surface area with a thick layer of a first-colored paint such that the first surface area is opaque;
    coating the second surface area with a thin layer of a second-colored paint such that the second surface area is substantially translucent;
    mounting a CHMSL housing behind the vehicle body panel; and
    mounting at least one light source adjacent the CHMSL housing for emitting light through the second surface area when the light source is turned on, the second surface area being smaller than the first surface area.

17. A method according to claim 16, further comprising placing a first masking tape over the second surface area and painting the remaining first surface area, and placing a second masking tape having a cutout defined by the first surface area over the remaining first surface area and painting the second surface area so that a paint thickness of the first surface area is different from a paint thickness of the second surface area.

18. A method according to claim 16, wherein the vehicle body panel is formed of at least one of PC (Polycarbonate), PC/ABS (Polycarbonate/Acrylonitrile-Butadiene-Styrene) and Acrylic.

19. A method according to claim 16, wherein the light source is at least one of a light emitting diode (LED), an organic light emitting diode (OLED), flexible Electroluminescence (EL), incandescent light bulb and neon light.

20. A method according to claim 16, wherein the second surface area is covered with a high gloss paint.

21. A method according to claim 16, wherein the first surface area is covered with a non-clear paint.

22. A method according to claim 16, wherein a paint thickness of the first surface area is approximately 6-10 microns.

23. A method according to claim 16, wherein a paint thickness of the second surface area is approximately 3-5 microns.

* * * * *